(No Model.) 3 Sheets—Sheet 2.
R. H. LOGAN & G. H. CULLEY.
CIGAR BUNCHING MACHINE.
No. 382,265. Patented May 1, 1888.
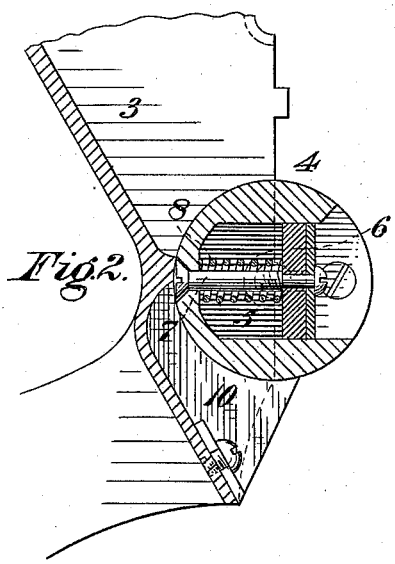
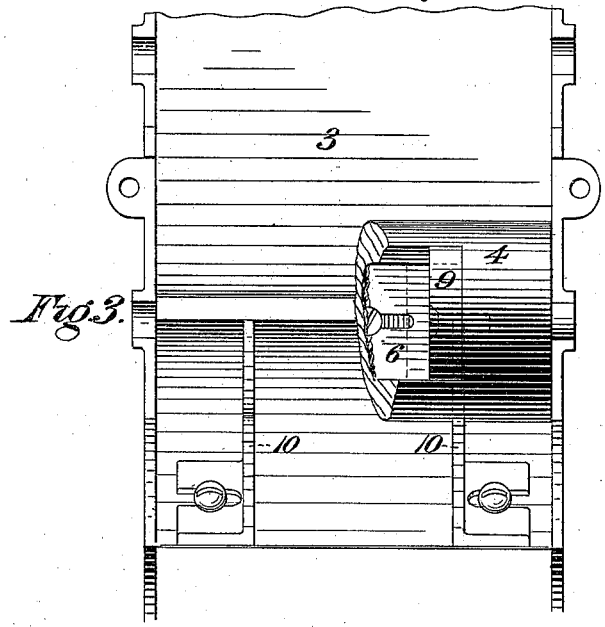
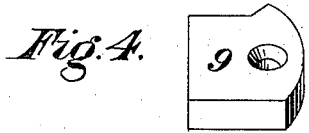
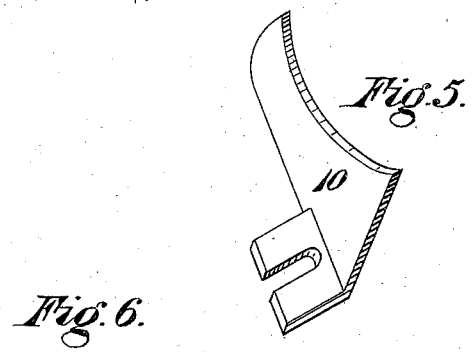
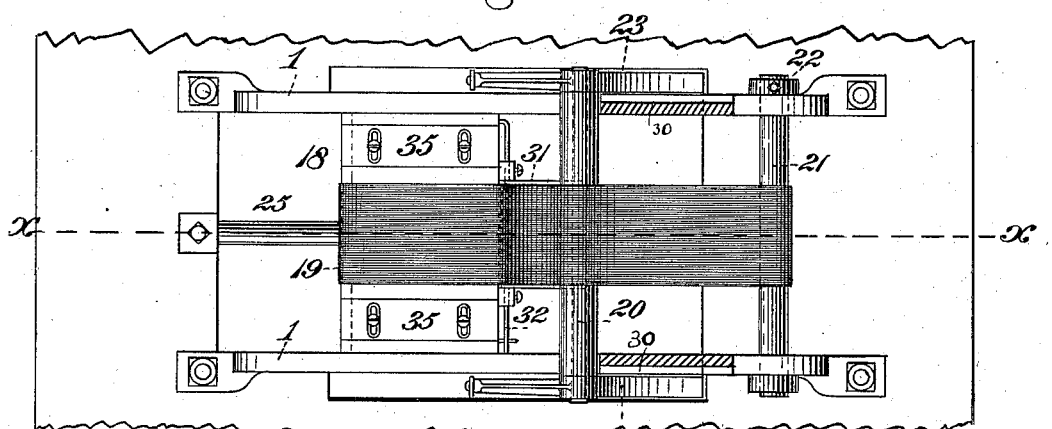
WITNESSES:
C. M. Clarke
Geo. H. Harvey
INVENTORS:
Ralph H. Logan
George H. Culley
By Darwin S. Wolcott
Att'y.
N. PETERS, Photo-Lithographer, Washington, D. C.

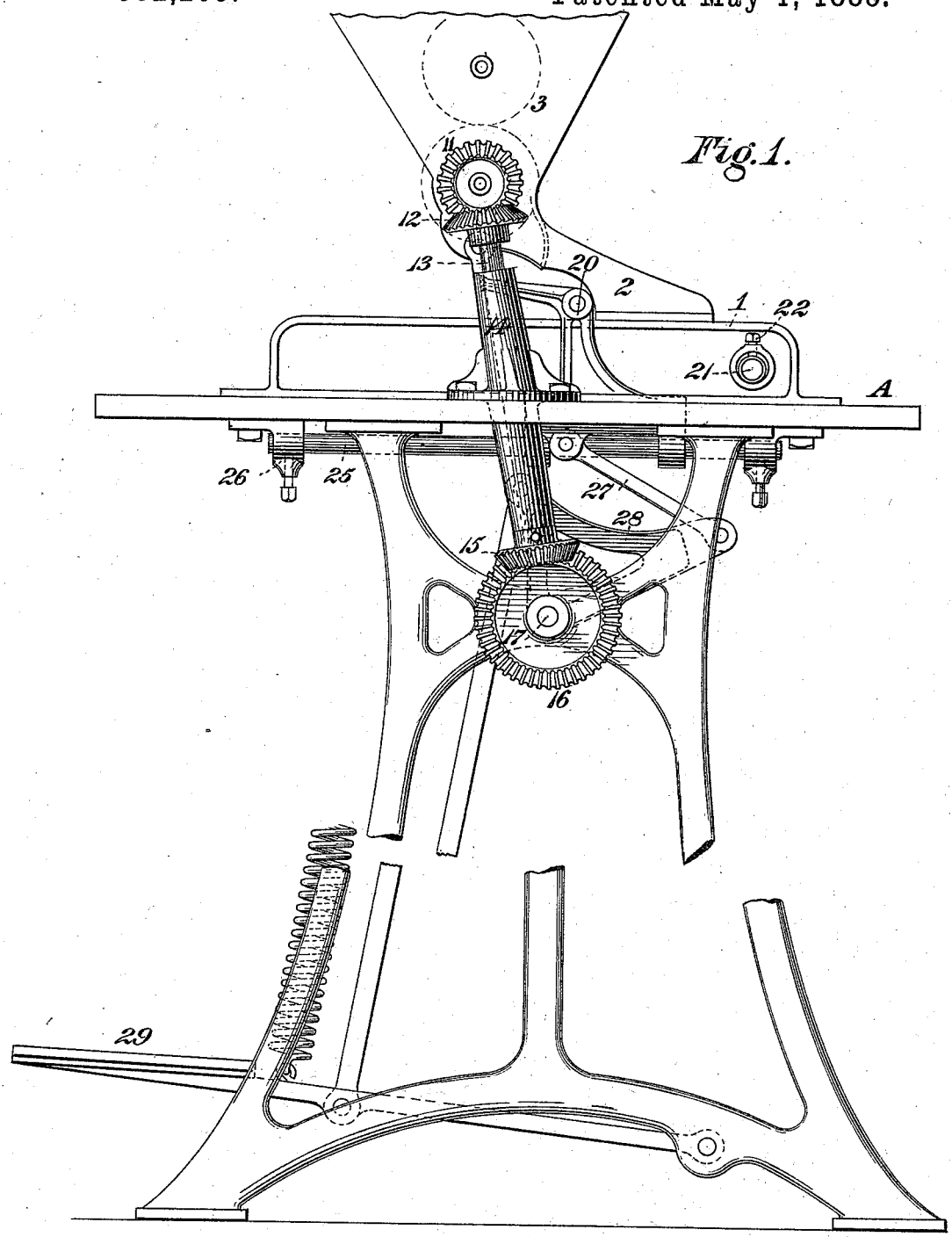

(No Model.) 3 Sheets—Sheet 3.
R. H. LOGAN & G. H. CULLEY.
CIGAR BUNCHING MACHINE.
No. 382,265. Patented May 1, 1888.
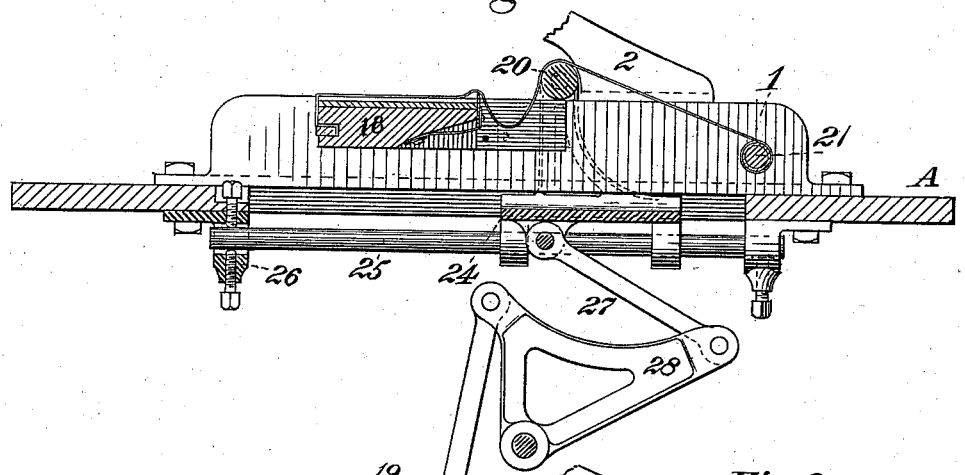
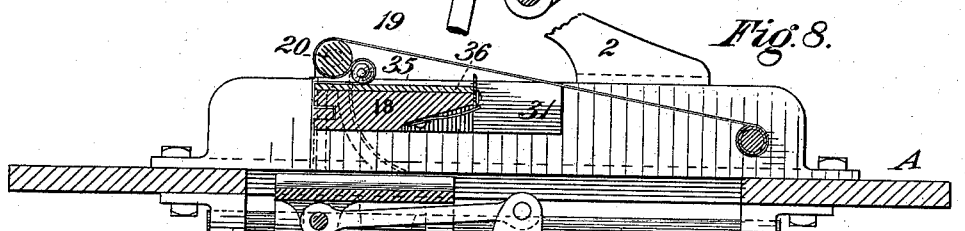
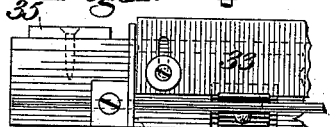
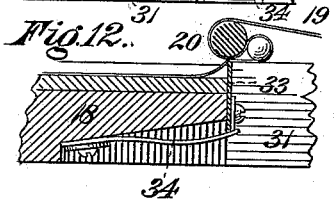
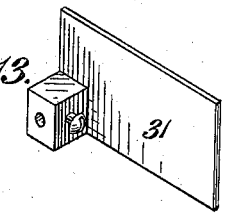
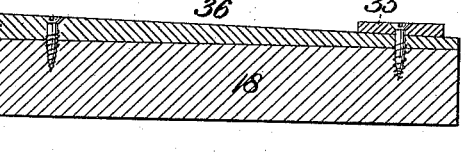

UNITED STATES PATENT OFFICE.

RALPH H. LOGAN AND GEORGE H. CULLEY, OF ALLEGHENY, ASSIGNORS TO JOHN K. COLLINS, OF GLENFIELD, PENNSYLVANIA.

CIGAR-BUNCHING MACHINE.

SPECIFICATION forming part of Letters Patent No. 382,265, dated May 1, 1888.

Application filed January 7, 1887. Serial No. 223,639. (No model.)

*To all whom it may concern:*

Be it known that we, RALPH H. LOGAN and GEORGE H. CULLEY, residing at Allegheny, in the county of Allegheny and State of Pennsylvania, citizens of the United States, have invented or discovered certain new and useful Improvements in Cigar-Bunching Machines, of which improvements the following is a specification.

In the accompanying drawings, which make part of this specification, Figure 1 is a view in side elevation of a cigar-bunching machine embodying our improvements. Fig. 2 is a sectional elevation of the feed-hopper and cylinder. Fig. 3 is a view in side elevation of a portion of the feed-hopper cylinder. Figs. 4 and 5 are perspective views of a gage block and plate. Fig. 6 is a top plan view of the machine, the hopper being removed. Fig. 7 is a sectional view of the bunching-table, the section being taken on the line $xx$, Fig. 6. Fig. 8 is a view similar to Fig. 7, showing the position of the various parts when the bunching-roll is at the forward end of its movement. Figs. 9 and 10 are sectional and top plan views of the bunching-table and its connections, the apron being removed. Fig. 11 is a view of a portion of the front end of the bunching-table, showing the stop plate. Fig. 12 is a sectional detail view of the bunching-table and roll, showing the position of the latter during the bunching operation. Fig. 13 is a detail view of one of the lateral retaining-plates. Fig. 14 is a sectional elevation of a modification of the bunching-table.

The invention herein relates to certain improvements in cigar-bunching machines, and has for its object such a construction and arrangement of parts as will measure and proportionately distribute the filler upon the wrapping-apron, and will also prevent a spreading out or displacement of the filler during the bunching operation.

In general terms the invention consists in the construction and combination of parts, substantially as hereinafter more fully described and claimed.

Upon the table A, supported by suitable legs, are bolted the side frames, 1, to which are bolted the brackets 2, carrying the feed-hopper 3, the measuring-cylinder 4 being journaled in the ends of said hopper. In the cylinder 4 is formed a recess, 5, in which is placed the adjustable plate 6, forming a movable bottom for said recess. This plate is adjusted by the screws 7, passing through the bottom wall of the recess and engaging said plate, which is held as against the action of the screws by the springs 8, surrounding the same. This movable plate, in connection with the removable blocks 9 at the ends of the recess, permit of the adjustment of the size of operative part of the recess 5, in accordance with the amount of filler to be used and the length of bunch to be formed, by raising or lowering the plate 6 and inserting thick or thin blocks 9 in the ends of the recess. In order to prevent any longitudinal spreading of the filler after its discharge from the recess in the cylinder, gage-plates 10, having one edge constructed to fit partially around the cylinder, are adjustably secured to one wall of the hopper below the cylinder, as clearly shown in Figs. 2 and 3. On one of the projecting journals of the cylinder 4 is secured the beveled wheel 11, intermeshing with a corresponding gear-wheel, 12, on the shaft 13, mounted in the sleeve 14, passing through the table A, the lower end of said shaft carrying the beveled gear 15, which engages a correspondingly-constructed gear, 16, on the power-shaft 17.

The bunching-table 18 is secured in any suitable manner between the side frames, 1, (see Fig. 6,) and to the front end of said table is attached one end of the wrapping-apron 19, which passes back over the table and the bunching-roll 20, and is attached to the tension-regulating bar or roller 21, mounted in the side frames, 1, and held as against rotation by the set-screws 22.

The bunching and binding roll 20 is loosely mounted in the arms 23 of the carriage 24, which is mounted on the bar 25, supported longitudinally of the table A by the brackets 26, bolted to the under side of the table. (See Figs. 1, 7, and 8.) The carriage 24 is connected by the link 27 to one arm of the bell-crank lever 28, secured at its apex or fulcrum to the shaft 17, said bell-crank and shaft being oscillated in one direction against the tension of a spring by the treadle 29, which is connected to the opposite arm of the bell-crank. The arms 23 project upwardly from the carriage 24 through slots 30 in the table A and support the roll 20 a slight distance above the surface of the bunching-table 18.

In forming bunches the filler is placed in the hopper 3, from whence it passes into the measuring-recess in the cylinder 4, the adjustable bottom 6 and sides 9 of said recess being previously adjusted in accordance with the size and length of the bunch to be formed. On the rotation of the cylinder 4, through the mechanism above described, the filler is discharged from the recess in the cylinder between the guide-plates 10, which have also been adjusted in accordance with the length of the bunch into the loop of the wrapping-apron 19. This wrapping-apron is made of a width equal to the length of the bunch, and on each side of the loop or bight in said apron are arranged the retaining-plates 31, which are adjustably mounted on a bar, 32, secured to the rear end of the bunching-table 18, and serve to retain the filler in the loop or bight in the apron until the same has been closed by the forward movement of the bunching-roll 20.

As bunching-machines are at present constructed it frequently happens that the filler is spread forward along the part of apron lying on the table 18 by the forward movement of the roll 20 in closing the loop in said apron, this defective action being incident to the difference in height between the upper surface of the bunching-table and the under surface of the bunching-roll. In order to prevent the diffusion of the filler, and to retain all the filler within the loop, a movable plate, 33, is attached to the rear end of the table transverse thereof and underneath the apron. This plate 33 is supported normally with its upper edge a little below a horizontal plane passing through the axis of the bunching-roll 20 by the spring 34, and is depressed by the bunching-roll during its forward movement. (See Fig. 12.) The plate 33, on account of its height or rise above the surface of the table 18, effectually prevents any forward spreading of the filler along the apron.

In order to prevent any longitudinal spreading of the filler after the loop has been withdrawn from between the retaining-plates 31 by the forward movement of the roll 20, additional retaining-plates 35 are adjustably secured on the table 18 on each side of the apron 19, the distance between said plates 35 corresponding to the length of the recess in the cylinder and the distance between the guide-plates 10 and the retaining-plates 31. It will be noticed that by means of the guide and retaining plates any longitudinal displacement of the filler is prevented from the time the filler leaves the measuring-cylinder until it is inclosed in a binder, and that spreading of the filler in front of the roll is prevented by the stop-plate 33, said mechanism effectually insuring the retention of the filler in the desired shape and the formation of uniform and compact bunches.

When it is desired to roll tapering bunches, a plate, 36, having an inclined upper surface is attached to the main bunching-table, as clearly shown in Fig. 14, in which case only one of the retaining-plates 35 is necessary, although both may be used, if desired.

We claim herein as our invention—

1. In a cigar-bunching machine, the combination of a feed-hopper, a recessed cylinder mounted in the discharge end of the hopper, the recess in said cylinder being provided with interchangeable bottom and end plates, adjustable guide-plates below the cylinder, and bunching and binding mechanism consisting of a table, a movable roll, and an apron, substantially as set forth.

2. In a cigar-bunching machine, the combination of filler-feeding mechanism, a bunching-table, a movable bunching-roller, an apron passing over the table and roller, and a yielding stop-plate transverse of the table and arranged to hold the apron above the surface of the table, substantially as set forth.

In testimony whereof we have hereunto set our hands.

RALPH H. LOGAN.
GEORGE H. CULLEY.

Witnesses:
DARWIN S. WOLCOTT,
R. H. WHITTLESEY.